Jan. 11, 1949.
J. KELLETT, III., ET AL  
CONTINUOUS CATALYTIC PROCESS FOR  
THE ACYLATION OF THIOPHENES  
Filed Feb. 12, 1946
2,458,514
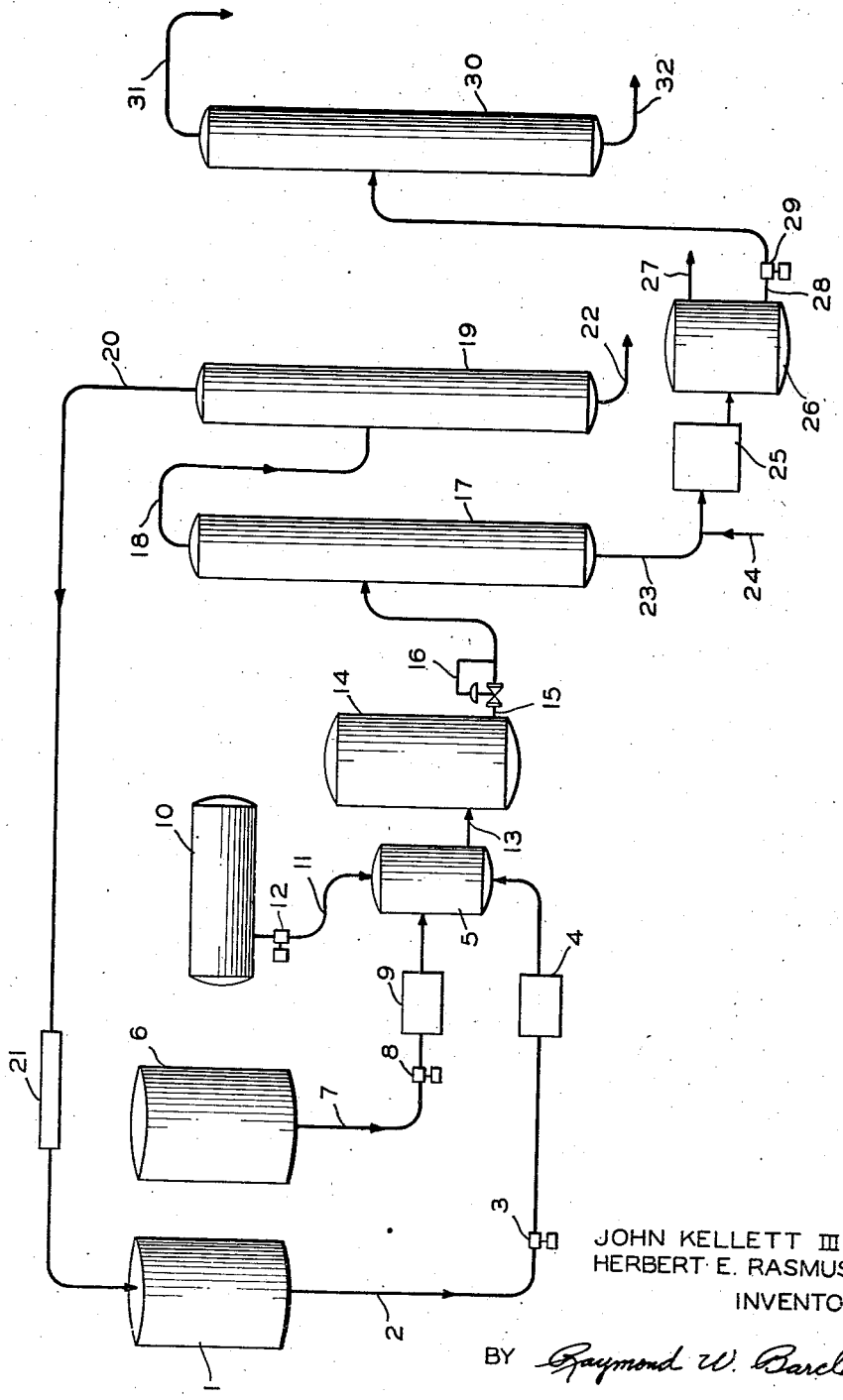
JOHN KELLETT III  
HERBERT E. RASMUSSEN  
INVENTORS
BY Raymond W. Barclay
AGENT Patented Jan. 11, 1949

2,458,514

UNITED STATES PATENT OFFICE 2,458,514

CONTINUOUS CATALYTIC PROCESS FOR THE ACYLATION OF THIOPHENES

John Kellett, III, and Herbert E. Rasmussen, Woodbury, N. J., assignors to Socony-Vacuum Oil Company, Incorporated, a corporation of New York Application February 12, 1946, Serial No. 647,174

17 Claims. (Cl. 260—329)

This invention relates to a continuous catalytic process for the acylation of thiophenes and, more particularly, is directed to a continuous method for the acylation of thiophenes and its derivatives in the presence of phosphoric acid as a catalyst.

Heretofore, the usual method for producing acylated thiophenes has involved the reaction of a thiophene with an acylating agent, such as a carboxylic acid anhydride or acyl halide, in the presence of aluminum chloride as a catalyst. Other catalysts which have been used include stannic chloride and titanium tetrachloride. These materials, although applicable with considerable success in the acylation of aromatic hydrocarbons, are only moderately successful where thiophene is involved. This appears to be due to the relative instability of the thiophene ring; the catalyst, for example aluminum chloride, attacking the ring at the sulfur linkages and causing many undesirable secondary products with resultant low yields of acyl thiophene. These previously employed processes, moreover, have the disadvantage that they must be carried out in batch-type operation because the ketone produced forms an addition compound with the aluminum chloride catalyst which must subsequently be decomposed by hydrolysis to obtain the desired ketone. Thus, for each molecular proportion of ketone obtained, one molecular proportion of aluminum chloride catalyst was consumed. With the increased use and demand in industry for acylated thiophenes, the need has arisen for a more efficient continuous process of manufacture. The process of the present invention contemplates fulfillment of this need. In accordance therewith, it has been found that thiophenes may be continuously acylated by reacting a thiophene and acylating agent in the presence of phosphoric acid as a catalyst. It has been discovered that by using said catalyst the acylation process may be effectively carried out in a continuous manner. In addition to effecting a smooth, continuous acylation process, it has been found that by employing phosphoric acid as a catalyst, undue formation of addition complexes, formerly encountered in the catalytic acylation of thiophene, have been substantially eliminated. The resulting product, as will be shown hereinafter, represents a substantially complete conversion of the thiophene treated to an acyl thiophene having one or more side chains corresponding to that of the acylating agent employed.

The acylating agents to be used herein may be an organic carboxylic acid anhydride or acyl halide. These may be derived by methods well known to the art from organic acids which may be either saturated or unsaturated. Thus, representative acylating agents to be used in this invention include the anhydrides of saturated fatty acids, such as acetic anhydride, propionic anhydride, ketene, etc.; the acyl halides of saturated fatty acids, such as acetyl chloride; the acyl halides of long chain acids, such as stearyl chloride; the anhydrides of unsaturated acids, such as crotonic anhydride; the acyl halides of unsaturated acids, such as crotonyl chloride; the anhydrides of aromatic acids, such as benzoic anhydride; and the acyl halides of aromatic acids, such as benzoyl chloride. These acylating agents are given merely by way of example and are not to be construed as limiting since other acyl halides or anhydrides of carboxylic acids, which will readily suggest themselves to those skilled in the art, may likewise be used. In general, the anhydrides of carboxylic acids, and particularly those of the fatty acids, are to be preferred as acylating agents.

Thiophene or derivatives of thiophene having one or more substituent groups, such as halogen, alkyl, aryl, or alkoxy groups attached to the thiophene ring may be acylated in accordance with this invention. The acylation of thiophene or its derivatives may be carried out employing substantially equimolar quantities of thiophene and acylating agent. However, for the purpose of the present invention, the presence of an excess of thiophene is definitely to be preferred. Such excess thiophene favors the complete conversion of acylating agent and thus eliminates the problem of subsequently separating and recovering said agent from the reaction mixture. This advantage, as those in the art will realize, is of a very practical significance. The amount of thiophene present in excess will be dependent upon the reaction conditions employed. In practice, it is preferable to use the least amount of excess thiophene which will give a complete conversion of the acylating agent charged under the reaction conditions. This amount may be readily determined by a few experimental runs. In addition, the presence of an excess of thiophene is desirable, giving rise, under similar conditions of reaction time and catalyst concentration, to an increased conversion of the acylating agent to desired ketone at a substantially lower temperature of reaction. Thus, when a 2:1 molar ratio of thiophene to acetic anhydride was employed, the reaction temperature could be materially reduced without affecting the yield of product obtained using an equimolar ratio. When the thiophene-acetic anhydride ratio was further raised to about 3:1, the temperature could be further lowered by 100° to 130° F. compared with that necessary when the 2:1 ratio was used. Thus, an excess of thiophene and preferably the least amount favoring complete conversion of the acylating agent under the reaction conditions contemplated for the present process is desirable.

The time required for the acylation reaction will be dependent in the concentration of phosphoric acid, the temperature of reaction, the type of reactor, and the ratio of reactants present. In general, the reaction time will be less than about 2 hours. Thus, reaction periods of the order of about 1 hour have been found to be effective when phosphoric acid is present in an amount of about 1 per cent by weight of the charge, said charge consisting of a 3:1 molar ratio of thiophene to acylating agent, and when the reaction temperature is between about 200 and about 250° F. When higher temperatures are used, the time required for acylation may be considerably reduced. For example, under the above conditions at 320° F., the reaction period may be reduced to about 10 minutes.

The temperature should preferably be maintained in the range of from about 200° F. to about 350° F. However, it may be varied over rather wide limits of from about 100° F. to about 500° F., depending on the charge material, type of reactor, catalyst concentration and period of reaction. It will be understood that when the higher temperatures are employed, pressure is necessarily applied to the system to maintain the reaction mixture in the liquid phase.

The amount of phosphoric acid catalyst employed will usually not exceed about 1 per cent by weight of the charge stock. Extremely small amounts of phosphoric acid approaching about 0.1 per cent by weight have some catalytic effect in promoting the acylation of thiophene. The smaller amounts of catalyst, however, require a higher temperature and a greater reaction period to obtain a practical yield of thienyl ketone. It is, of course, to be understood that the reaction variables of time, temperature, reactant ratio and catalyst concentration are more or less interdependent.

A particularly desirable feature of the process of this invention is to conduct the reaction under conditions such that a complete conversion of acylating agent to desirable products occurs. This procedure will in turn eliminate the troublesome problem of subsequent recovery of acylating agent from the product stream. The process of this invention, accordingly, comprises continuously reacting a thiophene with an acylating agent in the presence of a relatively small quantity of phosphoric acid catalyst at a suitable temperature for a sufficient period of time to effect the acylation of thiophene or thiophene derivative, and thereafter separating the reaction product mixture into its components to give the desired acylated thiophene. Unreacted thiophene is recovered and reused in producing additional acylated thiophene.

A suitable system for carrying out the continuous acylation of thiophene, in accordance with the present invention, is shown in the attached drawing. While the flow diagram indicated is directed particularly to the acetylation of thiophene with acetic anhydride, those skilled in the art will understand that a system similar to that shown could likewise be employed, with minor alterations, when other carboxylic acid anhydrides or acyl halides are used as the acylating agent.

Referring more particularly to the drawing, thiophene is continuously conducted from storage tank 1 through conduit 2, the flow rate being controlled by metering pump 3. The thiophene stream is forced through a preheater 4 to a mixing chamber 5. In a similar manner, acetic anhydride is continuously lead from storage tank 6 through conduit 7, metering pump 8 and a preheater 9 to mixing chamber 5. Phosphoric acid is conducted from storage tank 10 to the mixing chamber through conduit 11, the rate of flow being controlled by metering pump 12. The reactants and catalyst are thoroughly mixed in chamber 5 and then conducted through outlet 13 to the reactor 14, maintained at the desired reaction temperature.

At the completion of the reaction period, the reaction product mixture is lead through outlet 15 and through pressure reducer 16 to fractionating column 17. The fractionator is maintained at a temperature such that thiophene and acetic acid pass off as a vapor through an outlet 18 in the upper portion of the column to a second fractionating column 19, maintained at a lower temperature, whereby the mixture of thiophene and acetic acid is separated. The former passes as a vapor from the top of column 19 and is recycled through conduit 20 and condenser 21 to the thiophene storage tank 1. Acetic acid passes from the bottom of column 19 through outlet 22 to storage.

Acetylthiophene and phosphoric acid are removed from the bottom of column 17 through outlet 23. Dilute caustic, sufficient to neutralize the acid present in the stream, is introduced through conduit 24. The stream then passes to a mixer 25 and after thorough agitation is conducted to a settler 26. Phosphate solution is removed from the top of the settler through outlet 27, while crude acetylthiophene is withdrawn from the lower portion of the settler through pipe 28 and is metered by pump 29 to a fractionating tower 30. The fractionator is preferably maintained at a reduced pressure and a temperature such that acetylthiophene passes as a vapor from the upper portion of the column through outlet 31 and is condensed to give the desired product. A small amount of resinous tarry material collects in the bottom of column 30 and is removed through outlet 32.

Acylated thiophenes produced in accordance with this invention are useful as solvents, dye intermediates, addition compounds for petroleum fractions, plasticizers, odorants, perfume diluents, resin intermediates, and intermediates for chemical synthesis. Long chain alkyl thienyl ketones may also find uses as synthetic lubricants, waxes, extreme pressure additives for mineral oils and anti-foaming agents.

The following detailed examples are for the purpose of illustrating modes of effecting the acylation of thiophene in accordance with the process of this invention. It is to be clearly understood that this invention is not to be considered as limited to the specific acylating agents disclosed hereinafter or to the specific conditions set forth in the examples.

*Example 1*

A 3:1 molar ratio mixture of thiophene and acetic anhydride was prepared. Phosphoric acid (ortho) was added in an amount representing 0.92 per cent by weight of the total charge and the mixture conducted to the reactor at a controlled rate such that the product stream remained in the reactor at a temperature of 252° F. for a period of 1 hour. An analysis of a sample of the product stream ensuing from the reactor was made by titration of the acetic acid and acetic anhydride by the method of Radcliffe and Medofski (J. Soc. of Chem. Ind. 36, 1917, 628) to obtain the amount of each. The analysis showed a 100 per cent conversion of the acetic anhydride. The reaction product stream of acetylthiophene, acetic acid, phosphoric acid and unreacted thiophene was separated and the latter material is recycled for further use. The amount of acetylthiophene obtained represents 99.7 per cent by weight u'timate conversion of thiophene.

The yields of acetylthiophene to be obtained under varying reaction conditions are summarized in the following table:

| Example | Temp., °F. | Weight Per cent $H_3PO_4$ | Reaction Time, Hours | Weight Per cent of Acetic Anhydride in Total Charge | Weight Per cent of Acetic Anhydride Consumed | Weight Per cent Ultimate Conversion of Thiophene to Acetylthiophene |
|---|---|---|---|---|---|---|
| 2 | 218 | 1.01 | 1.0 | 24.5 | 98.4 | 96.7 |
| 3 | 160 | 1.02 | 1.0 | 26.0 | 85.2 | 98.0 |
| 4 | 250 | 0.56 | 1.0 | 29.6 | 68.1 | 98.9 |
| 5 | 310 | 0.51 | 1.0 | 27.6 | 93.0 | 99.0 |
| 6 | 348 | 0.52 | 1.0 | 27.6 | 99.6 | 98.6 |
| 7 | 345 | 0.27 | 1.0 | 28.6 | 62.3 | 99.1 |
| 8 | 380 | 0.25 | 1.0 | 28.3 | 80.3 | 99.0 |
| 9 | 255 | 0.99 | 1.0 | 36.2 | 83.8 | 98.4 |
| 10 | 300 | 1.0 | 1.0 | 36.2 | 90.5 | 99.3 |
| 11 | 350 | 1.01 | 1.0 | 36.2 | 97.5 | 99.6 |
| 12 | 255 | 1.07 | 0.5 | 36.0 | 75.6 | 99.0 |
| 13 | 255 | 0.95 | 2.0 | 33.8 | 83.5 | 98.7 |
| 14 | 255 | 0.96 | 1.0 | 29.2 | 90.7 | 99.2 |

From the above examples, it will be apparent that phosphoric acid is a successful catalyst for promoting the continuous acylation of thiophene, permitting substantially complete conversion of the acylating agent to desirable products and allowing unreacted thiophene to be recovered and recycled for further treatment.

We claim:

1. A continuous process for the acylation of thiophene, comprising reacting a mixture of thiophene and an acylating agent selected from the group consisting of acyl halides and carboxylic acid anhydrides in the presence of ortho phosphoric acid as a catalyst, separating the resultant reaction product mixture into its components and continuously withdrawing acylated thiophene from the system.

2. A continuing process for acylation of thiophene, comprising reacting a mixture of thiophene and an acylating agent selected from the group consisting of acyl halides and carboxylic acid anhydrides in the presence of ortho phosphoric acid as a catalyst, separating the resultant reaction mixture into its components, recycling unreacted thiophene and continuously withdrawing acylated thiophene from the system.

3. A continuous process for the acylation of thiophene, comprising reacting a mixture of thiophene and an acylating agent selected from the group consisting of acyl halides and carboxylic acid anhydrides in the presence of not more than about 1 per cent by weight of ortho phosphoric acid as a catalyst, separating the resultant reaction product mixture into its components and continuously withdrawing acylated thiophene from the system.

4. A continuous process for the acylation of thiophene, comprising reacting a mixture of thiophene and an acylating agent selected from the group consisting of acyl halides and carboxylic acid anhydrides in the presence of from about 0.1 to about 1 per cent by weight of ortho phosphoric acid as a catalyst, separating the resultant reaction product mixture into its components and continuously withdrawing acylated thiophene from the system.

5. A continuous process for the acylation of thiophene, comprising reacting a mixture of thiophene and an acylating agent selected from the group consisting of acyl halides and carboxylic acid anhydrides in the presence of ortho phosphoric acid as a catalyst at an elevated temperature for a period less than about 2 hours, separating the resultant reaction product mixture into its components and continuously withdrawing acylated thiophene from the system.

6. A continuous process for the acylation of thiophene, comprising reacting a mixture of thiophene and an acylating agent selected from the group consisting of acyl halides and carboxylic acid anhydrides in the presence of ortho phosphoric acid as a catalyst at a temperature of from about 200 to about 350° F. for a period less than about 2 hours, separating the resultant reaction product mixture into its components and continuously withdrawing acylated thiophene from the system.

7. A continuous process for the acylation of thiophene, comprising reacting an excess quantity of thiophene and an acylating agent selected from the group consisting of acyl halides and carboxylic acid anhydrides in the presence of ortho phosphoric acid as a catalyst at a temperature of from about 200 to about 350° F. for a period less than about 2 hours, separating the resultant reaction product mixture into its components, recycling unreacted thiophene and continuously withdrawing acylated thiophene from the system.

8. A continuous process for the acylation of thiophene, comprising reacting a 3:1 molar ratio mixture of thiophene and an acylating agent selected from the group consisting of acyl halides and carboxylic acid anhydrides in the presence of not more than about 1 per cent by weight of phosphoric acid as a catalyst at a temperature of from about 200° F. to about 350° F., separating the resultant reaction product mixture into its components, recycling unreacted thiophene and continuously withdrawing acylated thiophene from the system.

9. A continuous process for the acylation of thiophene, comprising reacting a mixture of thiophene and an acylating agent selected from the group consisting of acyl halides and carboxylic acid anhydrides in the presence of ortho phosphoric acid as a catalyst under conditions such that a complete conversion of acylating agent takes place and thereafter separating the resultant reaction product mixture into its components and continuously withdrawing acylated thiophene from the system.

10. A continuous process for the acylation of thiophene, comprising reacting a mixture of thiophene and a fatty acid anhydride in the presence of ortho phosphoric acid as a catalyst, separating the resultant reaction product mixture into its components and continuously withdrawing acylated thiophene from the system.

11. A continuous process for the manufacture of acetylthiophene, comprising reacting a mixture of thiophene and acetic anhydride in the presence of ortho phosphoric acid as a catalyst, separating the resultant reaction product mixture into its components and continuously withdrawing acetylthiophene from the system.

12. A continuous process for the manufacture of acetylthiophene, comprising reacting a mixture of thiophene and acetic anhydride in the presence of not more than about 1 per cent by weight of ortho phosphoric acid as a catalyst, separating the resultant reaction product mixture into its components and continuously withdrawing acetylthiophene from the system.

13. A continuous process for the acylation of thiophene, comprising reacting a mixture of thiophene and acetic anhydride in the presence of ortho phosphoric acid as a catalyst, separating the resultant reaction product mixture by distillation into two fractions, one consisting of acetic acid and thiophene and the other of acetylthiophene and phosphoric acid, thereafter separating the mixture of acetic acid and thiophene by fractional distillation, recycling the thiophene thus recovered for further acylation, separating the mixture of phosphoric acid and acetylthiophene by neutralizing the acid and removing the resultant phosphate solution from crude acetylthiophene and thereafter distilling the crude acetylthiophene obtained to yield a substantially pure acetylthiophene.

14. A continuous process for the acylation of thiophene, comprising reacting a mixture of thiophene and a carboxylic acid anhydride in the presence of ortho phosphoric acid as a catalyst, separating the resultant reaction product mixture by distillation into two fractions, one consisting of the carboxylic acid and thiophene and the other of acyl thiophene and phosphoric acid, thereafter separating the mixture of carboxylic acid and thiophene by fractional distillation, recycling the thiophene thus recovered for further acylation, separating the mixture of phosphoric acid and acyl thiophene by neutralizing the acid and removing the resultant phosphate solution from crude acyl thiophene obtained to yield a substantially pure acyl thiophene.

15. A continuous process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of ortho phosphoric acid as a catalyst, separating the resultant reaction product mixture into its components and continuously withdrawing an acylated thiophene from the system.

16. A continuous process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of not more than about 1 per cent by weight of ortho phosphoric acid as a catalyst, separating the resultant reaction product mixture into its components and continuously withdrawing an acylated thiophene from the system.

17. A continuous process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of ortho phosphoric acid as a catalyst under conditions such that a complete conversion of acylating agent takes place and thereafter separating the resultant reaction product mixture into its components and continuously withdrawing an acylated thiophene from the system.

JOHN KELLETT, III.
HERBERT E. RASMUSSEN.

REFERENCES CITED

The following references are of record in the file of this patent:

UNITED STATES PATENTS

| Number | Name | Date |
|---|---|---|
| 2,101,560 | Ralston | Dec. 7, 1937 |
| 2,432,991 | Hartough | Dec. 23, 1947 |

OTHER REFERENCES

Alles, J. Pharm. Exp. Ther. 72, 265 (1941), Ann. 424, 1 (1921).

Richter, "Organic Chemistry," 649–50, John Wiley, N. Y. 1938.

Karrer, "Organic Chemistry," 198, Nordeman Pub. Co., N. Y., 1938.

Calloway, Chem. Rev. 17, 376 and 377 (1935).

Fieser and Fieser, "Organic Chemistry," page 536, Heath & Co., Boston, Mass., 1944.